March 8, 1932.  S. R. BLAKELY  1,848,821
DIE
Filed Feb. 14, 1929  3 Sheets-Sheet 3
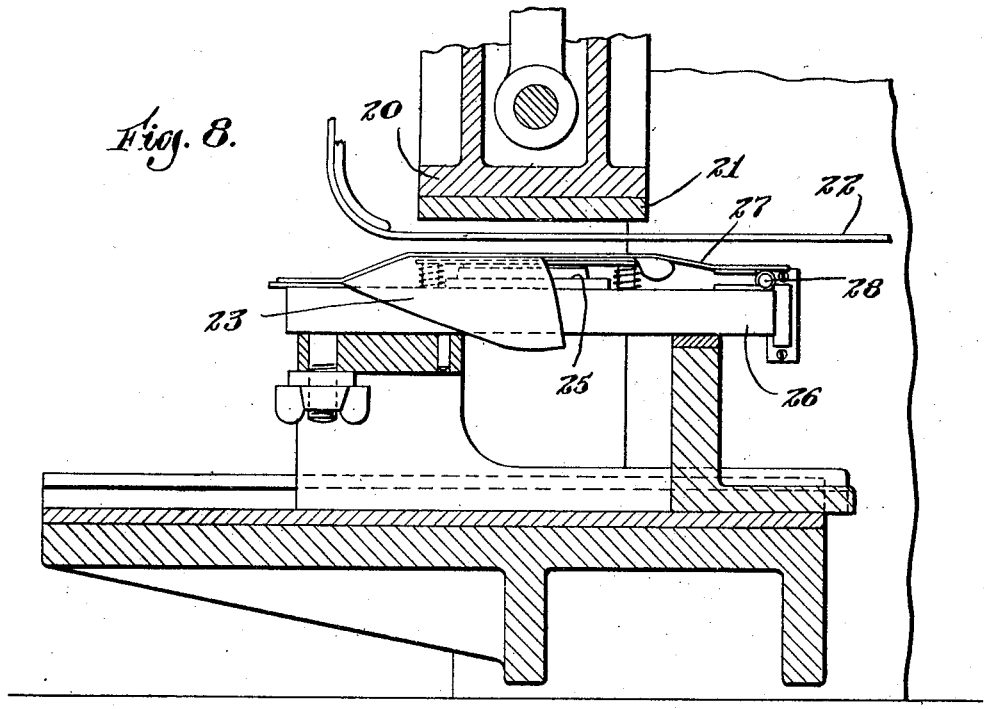
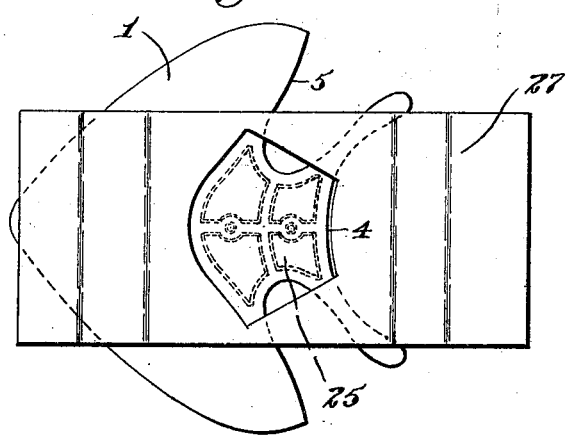
Inventor
Sidney R. Blakely
by James R. Hoyder
Attorney Patented Mar. 8, 1932

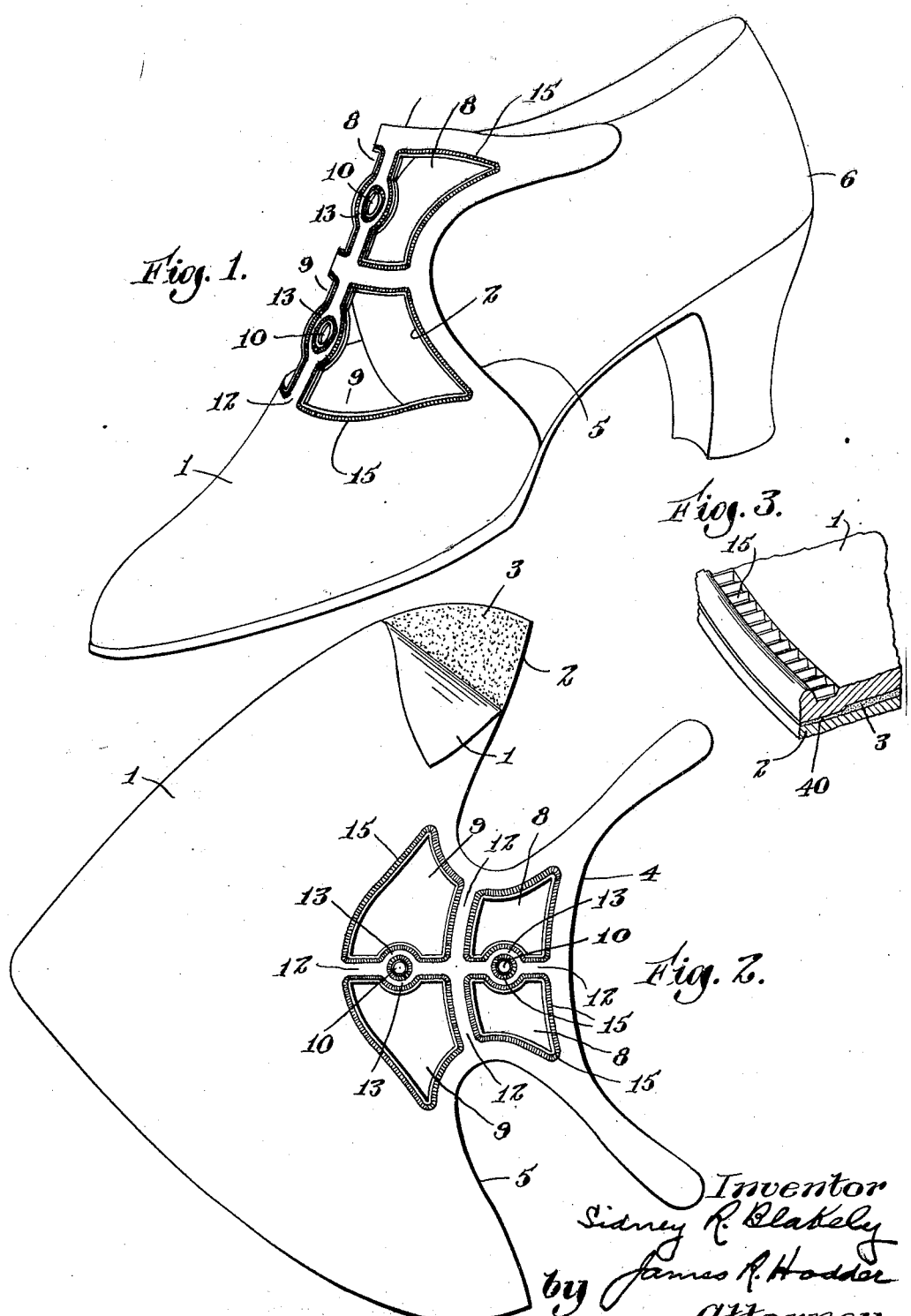

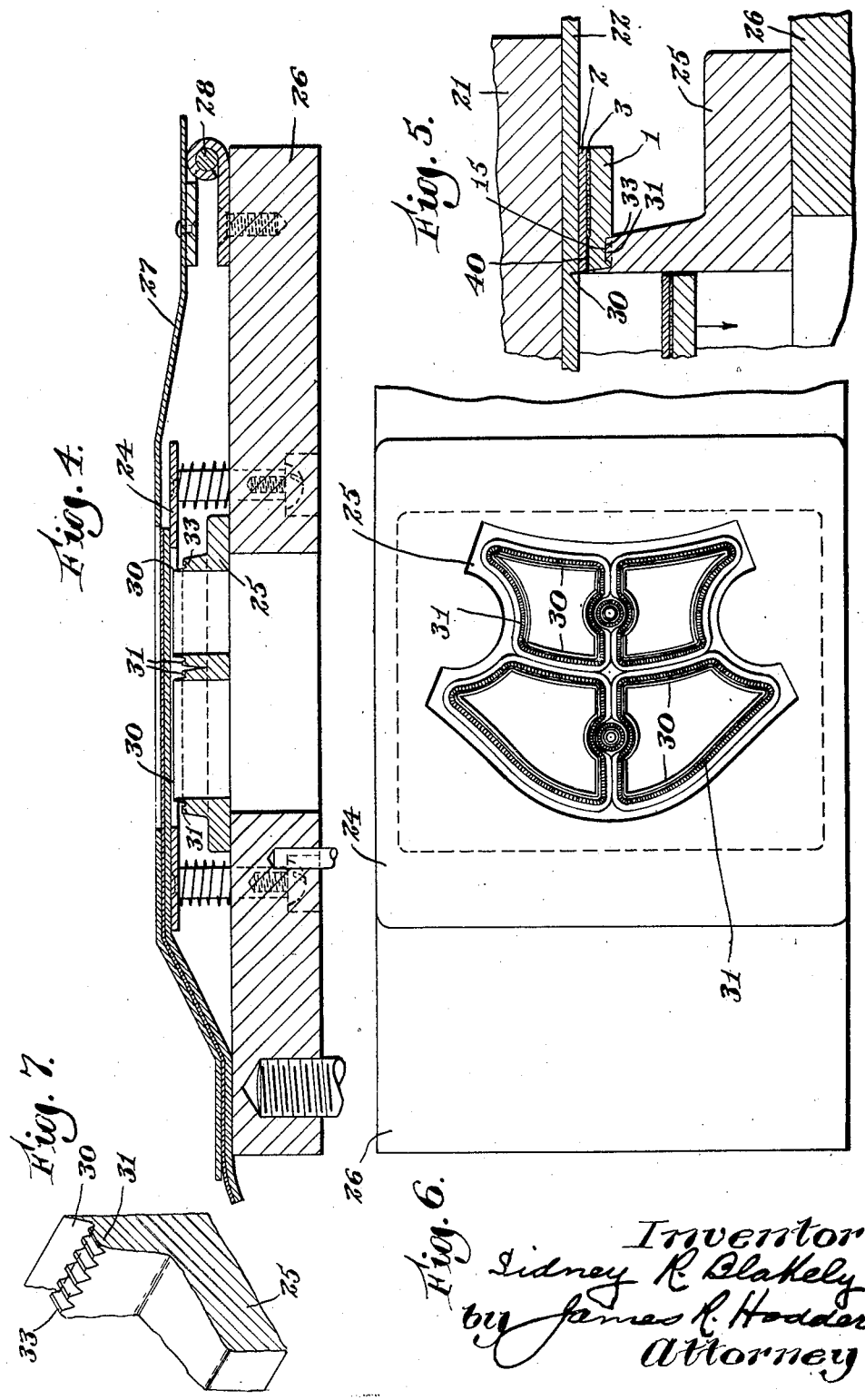

1,848,821

UNITED STATES PATENT OFFICE

SIDNEY R. BLAKELY, OF BOSTON, MASSACHUSETTS

DIE

Application filed February 14, 1929. Serial No. 339,813.

My present invention relates to the manufacture of boots and shoes, and particularly to a new cutting die for use in forming ornamental cut outs therein, cutting out the patterns, solidifying the marginal portion of the upper around the cut out part, and simultaneously impressing or indenting an imitation stitch thereon, together with a new and novel type of cutting and indenting die.

In the present manufacture of boots and shoes, particularly women's shoes, wherein openwork "cut out" portions are employed in the upper, it is customary to form the openwork or cut out portions by a so-called cut out press utilizing a die or dies having the contour desired for the pattern of the cut outs, and hence of the shoe upper. The design of these patterns constantly changes, and many of them are intricate and involved. The operations now required in the making of a boot or shoe consist in making special cutting dies for each of the patterns desired, assembling the upper materials, usually comprising a lining of canvas or leather, and the outer layer of leather, suede, or finished surface, cutting out the designs through both layers, and subsequently stitching the upper and lining together around the edge portion of the entire series of cut out portions, this stitching operation being extremely laborious, tedious, and slow, as well as expensive. The constant stitching, necessarily requiring close concentration and fine work following the edges of the cut contours is very trying on both the skill and the eyesight of the operators, and this work, largely performed by girls and women, can only be followed a few hours or part of the time in the day as the operator's skill and eyesight are apt to waver. The expense, also, of this work is tremendous in proportion to the other operations on this type of shoe. For example, the stitching operation alone on cut out designs of usual and normal contour, such as are now in universal style on women's shoes, involves an expense to the manufacturer of from ten cents to seventy five cents for each pair of shoes, for this stitching alone, depending entirely on the intricacy of the pattern produced by the cut outs. The time involved is proportional to the intricacy and difficulty of stitching around each edge portion of each cut out. Furthermore, the danger of ruining the entire shoe upper by errors is very great, and the damage from such reasons is considerable in this style of shoe manufacture.

My present invention obviates the difficulties and expense above briefly outlined, and eliminates entirely the necessity of stitching around the cut out portions of shoe upper materials. By my present invention I have devised a novel and improved means whereby the upper materials are automatically and simultaneously united, the edge portions around the cut outs of any design are also pressed, solidified, and firmly forced into a union, and the effect of the stitching as a finishing action, viz: an imitation stitch, is simultaneously and accurately applied, all at the same time and in the single operation of the cut out action.

I accomplish the above noted desirable features by first preparing suitable cement which will unite the upper materials around the cut out portions. This cement is and should be prepared for such special work as the shoe upper materials require. Thus, when leather and a canvas lining, for example, comprise the upper materials, I may provide special cement best suited for uniting these two layers. Where a leather outer surface and a leather lining comprise the upper materials, I may utilize a cement specially adaptable for uniting such two surfaces, and particularly if they are the respective flesh sides of the leather, as is usual. Where the outer layer is suede, satin, velvet, or the like, and appropriate lining, I employ suitable cement for each. The upper materials are usually united, around the top and at the heel when the upper is "closed" by stitching, and thereupon the desired cement is coated on one or both of the contacting surfaces of the outer upper and inner lining along the vamp, quarters, or various portions where the cut out design is to appear. Thereupon I subject the shoe to the cutting out action, utilizing a special and novel form of cutting die. Such die—of any design or contour desired for the shoe—has formed around the outer surfaces a shouldered portion proportionately spaced back of the cutting edge and with suitable contour to impress the outer surface of the upper being cut with the imitation stitch effect, and also in proper position to impart an extra pressure on the layers adjacent to the cut out openings, thus simultaneously cutting out and giving an impression stitch, and firmly uniting and solidifying and compressing the layers of the upper adjacent to the cut out portion into a firm union.

By means of my invention, the entire stitching operation around the narrow straps and intricate patterns involved is entirely eliminated, and the delay, time, danger of damage, and unusual expense heretofore required for the stitching of straps, edges, etc., is saved, while a wider range of more intricate designs is open to the shoe designer as there is no limitation to the design by the necessities and requirements of following same with a stitching machine.

Further advantages, improvements, and features will be hereinafter more fully described and claimed.

Referring to the drawings illustrating preferred embodiments of my invention and the methods employed, Fig. 1 is a view, partly in perspective, of my improved boot or shoe having a typical form of cut out design;

Fig. 2 is a view of a portion of the upper materials subjected to the cutting out action;

Fig. 3 is an enlarged fragmentary view illustrating the cutting out and stitch indenting, and solidifying action on the upper materials around the cut out portion;

Fig. 4 is a cross sectional fragmentary view showing my improved cut out die with the stitch indenting and compressing shoulder portions;

Fig. 5 is an enlarged fragmentary view showing the cutting out action;

Fig. 6 is a plan view of Fig. 4;

Fig. 7 is an enlarged fragmentary portion of the cutting out die and stitch indenting shoulder;

Fig. 8 is a view of the die and upper in a well known cut out press; and

Fig. 9 is a plan view of the same.

As shown in the drawings, I have illustrated a typical cut out shoe having an upper material in two layers, viz: the outer or finished layer 1 and the inner layer or lining 2 with a coating 3 of cement therebetween. These materials may be cut out, either flat as shown in Fig. 2, or as is more usual, the upper materials are united by stitching around the top, as at 4, and vamp or foxing stitchings 5, and at the extreme heel portion 6, and then with the upper thus "closed" or fitted, it is subjected to the cutting out action. By my arrangement of a novel cutting die, I not only cut out the openwork portions of any design desired such, for example, as shown herein for illustrative purposes with the cut out sections 8, 8, 9, 9, and 10, 10, leaving the resulting effect on the shoe as shown, particularly with the narrow straps 12, 12 and 13, 13, but simultaneously solidify the edge portions of the cut outs and form the imitation stitch 15 entirely around all of the same, and at a single operation with perfect accuracy.

Referring to the die of my present invention and obtaining the desirable advantages above briefly outlined, I have illustrated in Figs. 4, 5, 6, 7, 8, and 9 the details of this die construction and the cutting out method employed, illustrating the same in the well known type of cut out press shown, described, and claimed in U. S. Letters Patent No. 1,681,033, dated Aug. 14, 1928, to Benjamin W. Freeman, as I prefer to use this type of machine in the cutting out operation. It will also be appreciated that, while I have shown and described in fragmentary form this machine, and the same as operating on flat work, other machines could be utilized, and that the shoe upper is usually cut out when in "closed" or fitted form, as distinguished from the flat work, although either can be utilized in carrying out my invention. I also refer to said Freeman patent for details of the cut out machine, a fragment only being herein illustrated, viz: the presser member 20 having a presser plate 21 operating through a paper strip 22, the upper itself, designated at 23, being laid or draped over a stripper plate 24 and the die 25, the latter being mounted on the work holder 26 and held in place by a mask 27 pivoted at 28 to the work holder 26. The die 25 is of any suitable contour or design, and by my novel construction has formed adjacent to the cutting edge 30 a shouldered portion 31 of substantial width and depth, and having thereon a plurality of serrated or the like edges 33 which form the imitation stitch line 15 in the work. Preferably, also, I so proportion and position the shouldered section 31 of the die with the serrations 33 thereon as to effect a solidifying or a special compacting of the layers 1 and 2 and squeezing in the cement 3 in a firm manner, as clearly shown in Figs. 3 and 5, at 40.

The resulting cut out upper and the article of manufacture are of more attractive and uniform finish than would be the case of a stitched upper, the stitching necessarily varying somewhat in its alinement with the adjacent contour edge of the cut out openings, straps, etc. The upper and lining are firmly united, and under a special pressure at the edges of the opening, the shoulder 31 and the indenting action of the teeth 33 producing the imitation stitch 15, effecting a firm union, and binding the layers together at the desired edges even more firmly than the average stitching. All objectionable ridges or the like caused by a sewed seam are eliminated, and the saving in time, delay, damage to uppers, etc., as above explained, is effected.

It will thus be seen that I have devised a new type of cutting die which will perform the important additional functions with the cutting, and during the same operation as formerly, of solidifying the edge portions of the upper and lining, permitting the advantages of uniting these layers comprising the upper materials by utilizing cement, specially compressing the edge portions to give a firm binding effect and impart any desired finish to the outer surface, such as the imitation stitch. If separate operations were required in the employment of cement, the expense involved would be prohibitive.

The shoe upper thus made is suitable for, and capable of, use in any of the various shoe making methods, viz: for turn shoes, for welt shoes, for McKay shoes, for any of the several well-known cementing processes, such as "Ago", "Compo" or the like, or for any other known standard method of shoe manufacture wherein the shoe upper materials, comprising one or more layers, are utilized.

Having thus described my invention, what I claim as new is:

In a machine for cutting out a plurality of openwork designs in shoe upper materials, cutting dies, means to apply pressure thereto, yielding means opposite the cutting die to permit the cutting edge of said die to pass entirely through the upper materials and become embedded slightly in said yielding means, the cutting die having formed adjacent to the cutting edge portions a shoulder in position to engage the upper materials before the cutting out action is complete, said shoulder having an impression forming surface thereon proportionate to the cutting edge to engage the upper materials adjacent the cut-out openings and form an impression therein simultaneously with the cutting out action, whereby the upper materials are formed with a cut-out design and an impression stitch associated therewith simultaneously.

In testimony whereof, I have signed my name to this specification.

SIDNEY R. BLAKELY.